United States Patent [19]
Ishiko

[11] Patent Number: 5,722,246
[45] Date of Patent: Mar. 3, 1998

[54] ABSORPTION REFRIGERATING APPARATUS CONTROL METHOD

[75] Inventor: Hideo Ishiko, Ohra-gun, Japan

[73] Assignee: Sanyo Electric Co. Ltd., Osaka-fu, Japan

[21] Appl. No.: 699,930

[22] Filed: Aug. 20, 1996

[51] Int. Cl.$^6$ .................................................. F25B 15/00
[52] U.S. Cl. ............................................................ 62/148
[58] Field of Search .......................... 62/104, 105, 141, 62/148, 476

[56] References Cited

U.S. PATENT DOCUMENTS

| | | | |
|---|---|---|---|
| 3,426,548 | 2/1969 | Greacen et al. | 62/148 |
| 3,575,008 | 4/1971 | Lorenz | 62/103 |
| 4,164,128 | 8/1979 | Newton | 62/105 |

FOREIGN PATENT DOCUMENTS 626449  2/1987  Japan .

*Primary Examiner*—William Doerrler
*Attorney, Agent, or Firm*—Weingarten, Schurgin, Gagnebin & Hayes LLP

[57] ABSTRACT

To eliminate great increases in regeneration temperature and pressure and prevent the stoppage of an absorption refrigerating apparatus for safety upon a rise in the temperature of cooling water as well as to prevent crystallization and reduce fuel costs upon a reduction in the temperature of cooling water, the absorption refrigerating apparatus comprises a controller 34 which is constituted such that the opening of a fuel control valve 21 is controlled to a range of 0 to 100% to control the amount of heating in a high-temperature regenerator 1 when the inlet temperature T2 of cooling water is between a variable low-temperature set value and a variable high-temperature set value.

6 Claims, 2 Drawing Sheets

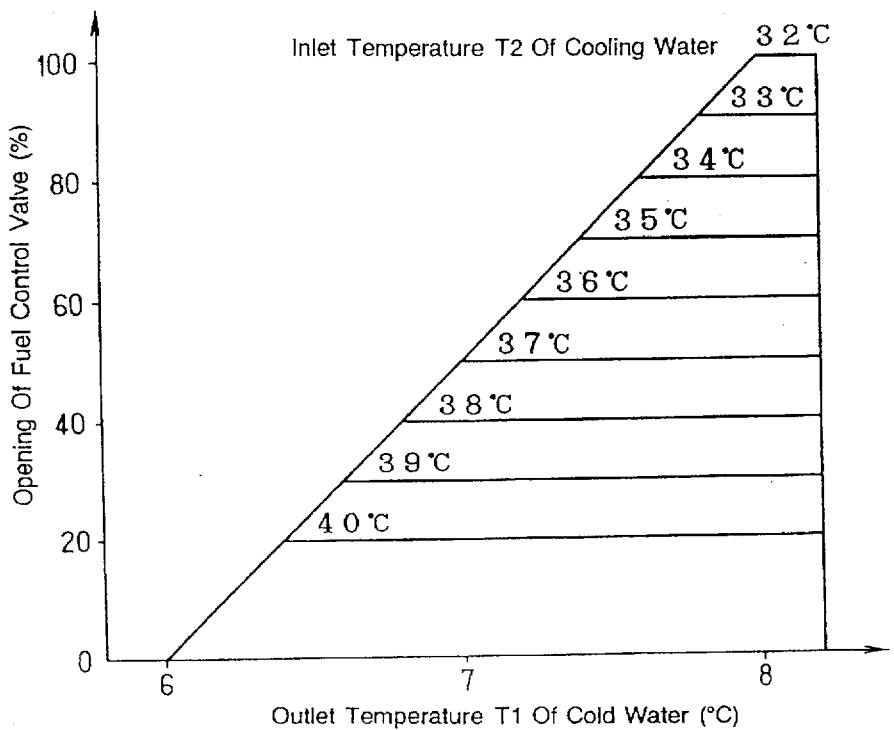
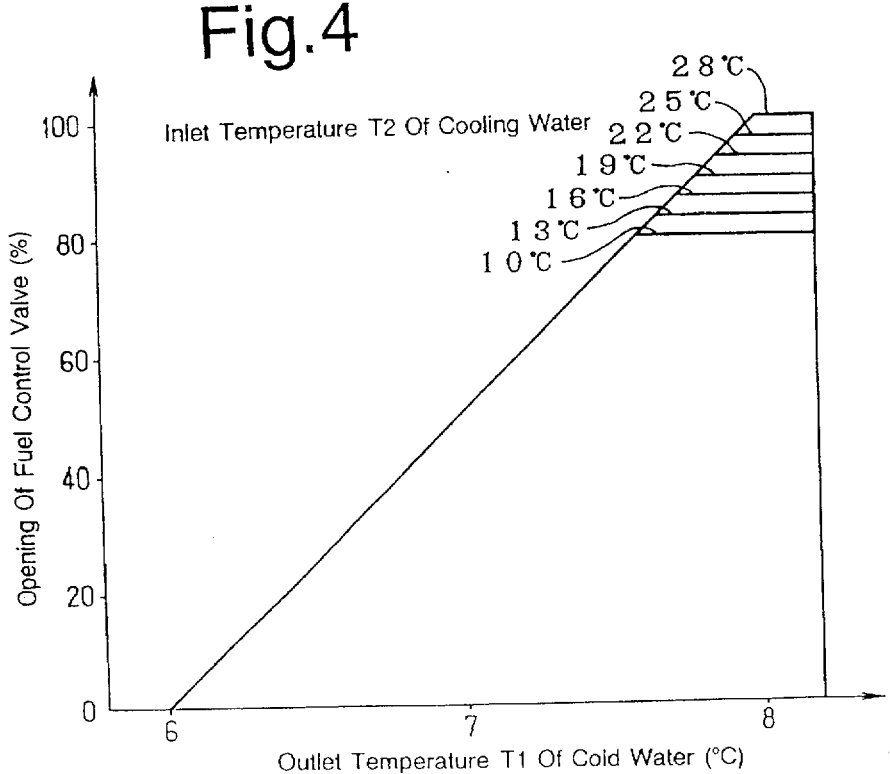

ABSORPTION REFRIGERATING APPARATUS CONTROL METHOD

BACKGROUND OF THE INVENTION

1. Field of the Invention

This invention relates to an absorption refrigerating apparatus control method for controlling the amount of heating in a regenerator based on the outlet temperature of cold water to be taken out of an evaporator.

2. Background Art

Japanese Utility Model Laid-open publication No.62-6449, for example, discloses an absorption refrigerating apparatus controller in which the amount of heating in a regenerator by the outlet temperature of cold water in an evaporator is compensated for by the inlet temperature of cold water to be supplied to an absorber and the opening of a fuel control valve is controlled by raising a set value of the cold water outlet temperature as the temperature of cooling water drops from 32° C. to 20° C.

However, in the above prior art, when the inlet temperature of cooling water becomes high and the load on cold water is large, the amount of heating in the regenerator becomes large, the regenerating temperature and pressure of a refrigerant increases and hence, there is the possibility that an absorption refrigerating apparatus may stop operation for safety.

Further, when the inlet temperature of cooling water becomes low due to a drop in the temperature of the outside air, the amount of heating in the regenerator increases, the consumption of fuel becomes larger than necessary, and the concentration of a concentrated solution becomes high, whereby there is the possibility that crystallization may occur.

SUMMARY OF THE INVENTION

It is therefore an object of the present invention to eliminate great increases in regeneration temperature and pressure and prevent the stoppage of an absorption refrigerating apparatus for safety when the inlet temperature of cooling water to be supplied to an absorber rises as well as to prevent crystallization and reduce fuel consumption when the inlet temperature of cooling water drops.

Further, it is another object of the present invention to make it possible to tune an absorption refrigerating apparatus suited to a recipient by making variable set values of the inlet temperature of cooling water which limits the maximum amount of heating so that it can match the temperature of cooling water on the site. It is still another object of the present invention to carry out stable operation without stopping the apparatus for alarming with a reduced capacity by tuning the refrigerating apparatus again when the refrigerating apparatus deteriorates according to secular changes and hardly exhibits its capacity.

To solve the problems of the prior art, the present invention provides an absorption refrigerating apparatus control method for controlling the amount of heating in a regenerator, which constitutes a refrigerating cycle by connecting an absorber, a condenser, an evaporator and the like by pipes, based on the outlet temperature of cold water to be taken out of the evaporator, wherein the maximum amount of heating is restricted based on the inlet temperature of cooling water when the inlet temperature of cooling water to be supplied to the absorber is higher than a variable high-temperature set value or lower than a variable low-temperature set value and the amount of heating is controlled based on the outlet temperature of cold water independent of the inlet temperature of cooling water until the amount of heating becomes maximal.

The present invention also provides an absorption refrigerating apparatus control method for controlling the opening of a control valve for controlling the amount of heating in a regenerator, which constitutes a refrigerating cycle by connecting an absorber, a condenser, an evaporator and the like by pipes, based on the outlet temperature of cold water to be taken out of the evaporator, wherein the maximum opening of the control valve is restricted based on the inlet temperature of cooling water when the inlet temperature of cooling water to be supplied to the absorber is higher than a variable high-temperature set value or lower than a variable low-temperature set value, and the opening of the control valve is controlled based on the outlet temperature of cold water independent of the inlet temperature of cooling water until the opening of the control valve becomes maximal.

The inlet temperature of cooling water to be supplied to the absorber changes according to temperature variations. In the case of the control method of the first aspect of the present invention, when the inlet temperature of cooling water is higher than a high-temperature set value or lower than a low-temperature set value which has been preset, the amount of heating in a high-temperature regenerator is controlled based on the outlet temperature of cold water taken out of the evaporator independent of the inlet temperature of cooling water until the amount of heating becomes the maximum value which is restricted based on the inlet temperature of cooling water. Therefore, a great increase in the load of cold water can be handled swiftly.

When the amount of heating based on the outlet temperature of cold water exceeds the maximum value, great increases in regeneration temperature and pressure can be prevented because the amount of heating is limited to a value lower than the maximum value determined by the inlet temperature of cooling water. Thereby the stoppage of an absorption refrigerating apparatus for safety can be prevented.

Since the amount of heating in a high-temperature regenerator is limited, the consumption of fuel can be reduced and crystallization can be prevented because the concentration of an absorption solution flown from the high-temperature regenerator is reduced.

Further, it is possible to deliver and install a refrigerating apparatus in which the high-temperature set value and the low-temperature set value have been matched with the temperature of cooling water on the site, and stable operation can be effected by tuning the apparatus again without stopping it for alarming with a reduced capacity when it hardly exhibits its capacity due to its deterioration caused by secular changes.

In the case of the control method of the second aspect of the present invention, when the inlet temperature of cooling water is higher than a high-temperature set value or lower than a low-temperature set value, the amount of heating is controlled based on the outlet temperature of cold water to be taken out of the evaporator independent of the inlet temperature of cooling water until the opening of the control valve for controlling the amount of heating in the regenerator becomes the maximum value which is limited based on the inlet temperature of cooling water. Therefore, a great increase in the load of cold water can be handled swiftly.

Since the opening of the control valve is limited to a value smaller than the maximum opening determined by the inlet temperature of cooling water when the opening of the control valve based on the outlet temperature of cold water exceeds the maximum value, great increases in regeneration temperature and pressure can be prevented, thereby preventing the stoppage of an absorption refrigerating apparatus for safety.

As the opening of the control valve is restricted, fuel consumption can be reduced and crystallization can be prevented because the concentration of an absorption solution flown from the high-temperature regenerator is reduced.

It is possible to deliver and install a refrigerating apparatus in which the high-temperature set value and the low-temperature set value have been matched with the temperature of cooling water on the site, and stable operation can be effected by tuning the apparatus again without stopping it for alarming with a reduced capacity when it hardly exhibits its capacity due to its deterioration caused by secular changes.

BRIEF DESCRIPTION OF THE DRAWINGS

These and other objects and advantages of the present invention will become clear from the following description with reference to the accompanying drawings, wherein:

FIG. 3 is a diagram showing the relationship between the outlet temperature of cold water and the opening of the fuel control valve when the inlet temperature of cooing water is high; and FIG. 4 is a diagram showing the relationship between the outlet temperature of cold water and the opening of the fuel control valve when the inlet temperature of cooling water is low.

DETAILED DESCRIPTION OF THE PREFERRED EMBODIMENTS

A preferred embodiment of the present invention according to the present invention is described in detail hereinunder with reference to the accompanying drawings.

Figure 1:
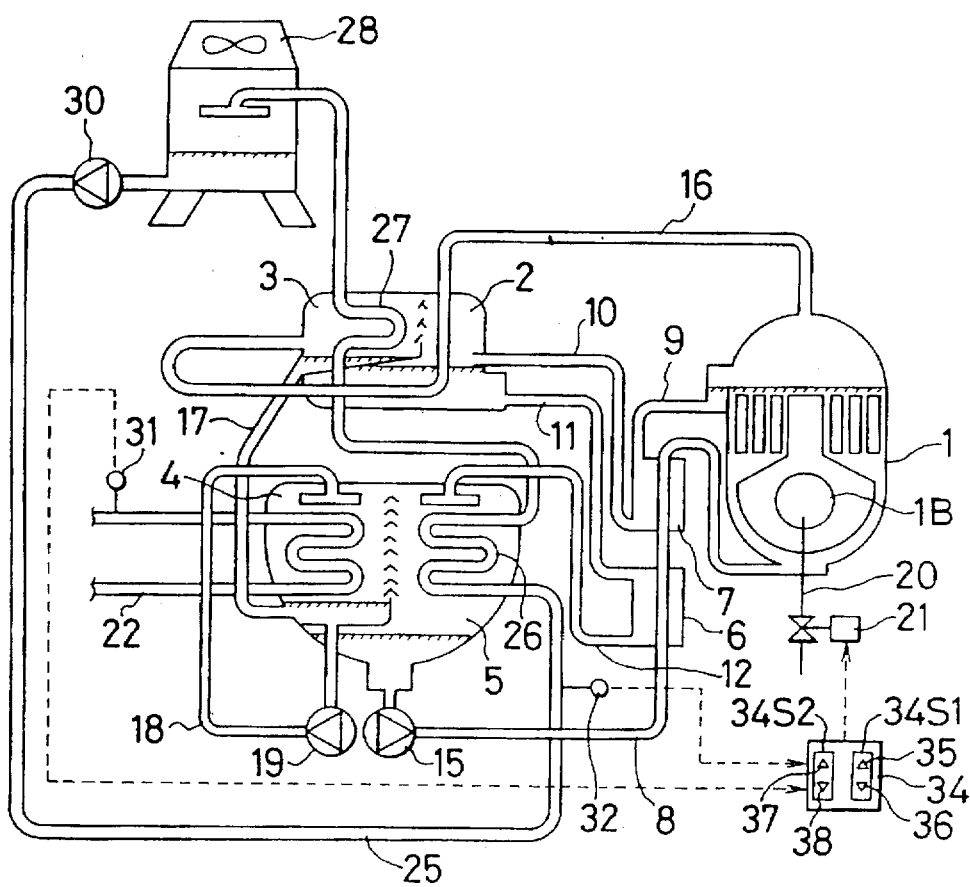
FIG. 1 is a structural diagram of an absorption refrigerating apparatus according to an embodiment of the present invention.

In FIG. 1, there is shown a double-effect absorption refrigerating apparatus which uses water ($H_2O$) as a refrigerant and a lithium bromide (LiBr) aqueous solution as an absorption agent (absorption solution).

In FIG. 1, reference numeral 1 is a high-temperature regenerator equipped with a burner 1B, 2 a low-temperature regenerator, 3 a condenser, 4 an evaporator, 5 an absorber, 6 a low-temperature heat exchanger, 7 a high-temperature heat exchanger, 8 to 12 absorption solution pipes, 15 an absorption solution pump, 16 to 18 refrigerant pipes, 19 a refrigerant pump, 20 a gas pipe connected to the gas burner 1B, 21 a fuel control valve provided as means for controlling the amount of heating by adjusting the flow rate of a gas to be supplied as fuel, and 22 a cold water pipe (load pipe), all of which are arranged and connected by pipes as shown in FIG. 1.

Reference numeral 25 is a cooling water pipe along which an absorber heat exchanger 26 and a condenser heat exchanger 27 are provided. Reference numeral 28 is a cooling tower and 30 a cooling water pump, both of which are connected to the cooling water pipe 25 to constitute a cooling circuit.

Reference numeral 31 is temperature detection means (to be referred to as "first temperature sensor" hereinafter) for detecting the outlet temperature T1 of cold water provided on the outlet side of the evaporator 4 of the cold water pipe 22, and 32 temperature detection means (to be referred to as "second temperature sensor" hereinafter) for detecting the inlet temperature T2 of cooling water provided on the cooling water pipe 25 on the inlet side of the absorber 5.

Reference numeral 34 is a controller constituted to incorporate a microcomputer, which receives temperature signals from the first and second temperature sensors 31 and 32 and outputs a desired opening signal to the fuel control valve 21.

During the operation of the above double-effect absorption refrigerating apparatus, the refrigerant evaporated in the high-temperature regenerator 1 enters the condenser 3 through the low-temperature regenerator 2, heat exchanges with water running through the condenser heat exchanger 27 to be condensed and liquified, and flows into the evaporator 4 through the refrigerant pipe 17. Thereafter, the refrigerant solution heat exchanges with water in the cold water pipe 22 to be evaporated and thereby the water in the cold water pipe 22 is cooled by the heat of evaporation. The refrigerant evaporated by the evaporator 4 is absorbed into the absorption solution in the absorber 5.

The absorption solution whose concentration is reduced by absorbing the refrigerant is supplied to the high-temperature regenerator 1 through the low-temperature heat exchanger 6 and the high-temperature heat exchanger 7 by the operation of the absorption solution pump 15. The absorption solution which has entered the high-temperature regenerator 1 is heated by the gas burner 1B, the refrigerant is thereby evaporated, and the absorption solution now having an intermediate concentration flows into the low-temperature regenerator 2 through the high-temperature heat exchanger 7.

The absorption solution which has entered the low-temperature regenerator 2 is heated by the refrigerant vapor flown from the high-temperature regenerator 1 through the refrigerant pipe 16, whereby the refrigerant is evaporated and separated to increase the concentration of the absorption solution. The absorption solution now having a high concentration (to be referred to as "concentrated solution" hereinafter) is heat exchanged in the low-temperature heat exchanger 6 to reduce its temperature, flows into the absorber 5 and is sprayed.

When the inlet temperature T2 of cooling water detected by the second temperature sensor 32 is between a variable low-temperature set value, for example, 28° C. and a variable high-temperature set value, for example, 32° C., the amount of heating in the high-temperature regenerator 1 is controlled by adjusting the opening of the fuel control valve 21 to a range of 0 to 100%. However, when the inlet temperature T2 of cooling water exceeds a high temperature set value of 32° C. due to a reduction in the radiating capacity of the cooling tower 28 caused by a rise in the outside temperature during the summer period, or when the inlet temperature T2 of the cooling water falls below a low-temperature set value of 28° C. due to an increase in the radiating capacity of the cooling tower 28 caused by a reduction in the outside temperature during the winter period, as shown by a solid line in FIG. 2, the controller 34 is constituted such that the maximum value of the amount of heating in the high-temperature regenerator 1 is restricted by limiting the maximum opening Y of the fuel control valve 21 to a small value.

In other words, the controller 34 operates such that, when the inlet temperature T2 of cooling water is between a low-temperature set value of 28° C. and a high-temperature set value of 32° C., the maximum opening Y of the fuel control valve 21 is controlled to 100%, when the inlet temperature T2 of cooling water is higher than a high-temperature set value of 32° C., the maximum opening Y of the fuel control valve 21 is reduced by 10% each time the inlet temperature T2 of cooling water is increased by 1° C., and when the inlet temperature T2 of cooling water is lower than a low-temperature set value of 28° C., the maximum opening Y of the fuel control valve 21 is reduced by 10/9% each time the inlet temperature T2 of cooling water is reduced by 1° C.

The actual opening control of the fuel control valve 21 is carried out based on the outlet temperature T1 of cold water detected by the first temperature sensor 31 as shown in FIG. 3 and FIG. 4, for example.

That is, since the opening of the fuel control valve 21 is controlled by proportional control based on the outlet temperature T1 of cold water until the outlet temperature T1 of cold water, rises to 7° C. when the inlet temperature T2 of cooling water is 37° C., for example, until the outlet temperature T1 of cold water rises to 7.4° C. when the inlet temperature T2 of cooling water is 35° C., for example, until the outlet temperature T1 of cold water rises to 7.6° C. when the inlet temperature T2 of cooling water is 10° C., for example, and until the outlet temperature T1 of cold water rises to 7.8° C. when the inlet temperature T2 of cooling water is 19° C., for example, an increase in the load of cold water can be handled swiftly.

As described above, as the inlet temperature T2 of cooling water rises more beyond a high-temperature set value, the amount of heating in the high-temperature regenerator 1 is restricted by limiting the maximum opening Y of the fuel control valve 21 to a smaller value. Therefore, even if the inlet temperature T2 of cooling water becomes high, great increases in regeneration temperature and pressure can be eliminated, thereby preventing stoppage of an absorption refrigerating apparatus for safety.

Since the maximum opening Y of the fuel control valve 21 is restricted more as the inlet temperature T2 of cooling water falls more below a low-temperature set value, for example, the maximum opening is restricted to 90% when the inlet temperature T2 of cooling water is 19° C. and to 80% when it is 10° C., the fuel consumption of the gas burner 1B is reduced when the inlet temperature T2 of cooling water becomes low.

Since it is possible to reduce the concentration of the absorption solution flown from the high-temperature regenerator 1 by controlling the amount of heating to a small value, crystallization in the low-temperature heat exchanger 6 can be prevented by reducing the concentration of the absorption solution flown from the low-temperature regenerator 2.

In addition, since the controller 34 comprises a switch for changing the high-temperature set value (to be referred to as "first changing switch" hereinafter) 34S1 and a switch for changing the low-temperature set value (to be referred to as "second changing switch" hereinafter) 34S2, it is possible to change both the high-temperature set value and the low-temperature set value by operating the first changing switch 34S1 and the second changing switch 34S2.

That is, the first changing switch 34S1 has an up switch 35 for increasing the set value and a down switch 36 for reducing the set value. Like the first changing switch 34S1, the second changing switch 34S2 has an up switch 37 and a down switch 38.

The first changing switch 34S1 and the second changing switch 34S2 are not limited to the above constitutions and may be dial type changing switches.

Figure 2:
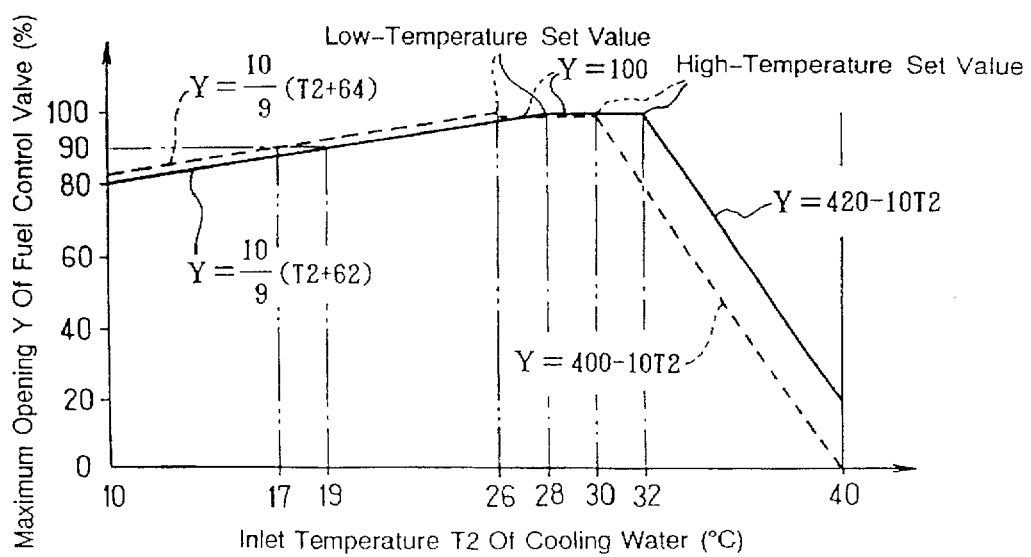
FIG. 2 is a diagram showing the relationship between the inlet temperature of cooling water and the maximum opening of a fuel control valve.

For instance, when a refrigerating apparatus is installed in an area where the inlet temperature T2 of cooling water becomes low, as shown by a broken line in FIG. 2, it is possible to carry out the operation control of the refrigerating apparatus that has been matched with the temperature of actually used cooling water by changing the high-temperature set value from 32° C. to 30° C. and the low-temperature set value from 28° C. to 26° C., for example.

Even when the refrigerating capacity of an apparatus deteriorates due to secular changes, it is possible to continue stable operation by resetting a high-temperature set value and a low-temperature set value of the inlet temperature T2 of cooling water without stopping the operation of the apparatus for alarming while a reduced capacity is permitted.

It is to be distinctly understood that the invention is not limited to the above embodiment but may be otherwise variously embodied without departing from the spirit and scope thereof.

For example, in the case that a driving heat source is vapor, the same function and effect can be obtained by controlling the amount of heating in the regenerator by controlling a vapor control valve in the same manner as the above fuel control valve.

In a single-effect refrigerating apparatus in which a driving heat source is low-temperature hot water, the same function and effect can be obtained by controlling the amount of heating in the regenerator by controlling a hot water control valve in the same manner as the above fuel control valve.

The present invention is a control method for an absorption refrigerating apparatus constituted above. The maximum value of the amount of heating in the regenerator is controlled based on the inlet temperature of cooling water when the inlet temperature of cooling water to be supplied to the absorber is higher than a variable high-temperature set value or lower than a variable low-temperature set value, and the amount of heating in the regenerator is controlled based on the outlet temperature of cold water to be taken out of the evaporator independent of the inlet temperature of cooling water until the amount of heating in the regenerator becomes maximal. Therefore, great increases in regeneration temperature and regeneration pressure when the inlet temperature of cooling water rises are prevented, thereby avoiding the stoppage of the absorption refrigerating apparatus for safety due to a rise in the temperature of cooling water.

When the inlet temperature of cooling water drops, the amount of heating in the regenerator is reduced and accordingly, the concentration of the absorption solution flown from the regenerator is lowered, thereby preventing crystallization. Due to a reduction in fuel consumption, operation costs can be reduced.

Since the amount of heating in the regenerator is controlled based on the outlet temperature of cold water until the amount of heating in the regenerator becomes maximal, a change in the load of cold water can be handled swiftly.

In addition, since it is possible to deliver and install an apparatus in which the high-temperature set value and low-temperature set value of the inlet temperature of cooling water have been matched with the temperature of cooling water on the site and to tune the apparatus again when it hardly exhibits its capacity due to its deterioration caused by secular changes, stable operation can be effected without stopping the apparatus for alarming with a reduced capacity.

Since the present invention is a method for controlling the maximum opening of the fuel control valve provided in the regenerator based on the inlet temperature of cooling water when the inlet temperature of cooling water to be supplied to the absorber is higher than a variable high-temperature set value or lower than a variable low-temperature set value and for controlling the opening of the fuel control valve based on the outlet temperature of cold water to be taken out of the evaporator independent of the inlet temperature of cooling water until the opening of the fuel control valve becomes maximal, it is possible to prevent the stoppage of a refrigerating apparatus for safety due to great increases in the regeneration temperature and pressure of the refrigerant by reducing the amount of heating in the regenerator when the inlet temperature of cooling water rises or falls.

Also in this control method, the amount of heating in the regenerator is reduced, thereby making it possible to prevent the production of crystals and cut the operation costs of an absorption refrigerating apparatus. Further, a change in the load of cold water can be handled swiftly.

Since it is possible to deliver and install an apparatus in which a high-temperature set value and a low-temperature set value of the inlet temperature of cooling water have been matched with the temperature of cooling water on the site and tune the apparatus again when it hardly exhibits its capacity due to its deterioration caused by secular changes, stable operation can be effected without stopping the apparatus for alarming with a reduced capacity.

What is claimed is:

1. A method for controlling the amount of heating in a regenerator of an absorption refrigerating apparatus having an absorber and an evaporator, wherein the amount of heating in the regenerator is dependent upon the opening of a fuel control valve, and wherein cooling water is supplied to the absorber and cold water is removed from the evaporator, said method comprising the steps of:

determining a maximum value for the opening of the fuel control valve based upon the inlet temperature of cooling water supplied to the absorber; and controlling the amount of heating in the regenerator by controlling the opening of the fuel control valve based upon the outlet temperature of cold water removed from the evaporator, independent of the inlet temperature of cooling water supplied to the absorber, until the opening of the fuel control valve reaches the maximum value, at which point the opening of the fuel control valve is limited to the maximum value.

2. The method as defined in claim 1, wherein said step of determining a maximum value for the opening of the fuel control valve comprises the steps of:

setting a low-temperature value for the inlet temperature of cooling water supplied to the absorber;

setting a high-temperature value for the inlet temperature of cooling water supplied to the absorber;

determining that the maximum value for the opening of the fuel control valve is 100% when the inlet temperature of cooling water supplied to the absorber is between the low-temperature value and the high-temperature value; and determining that the maximum value for the opening of the fuel control valve is decreased from 100% when the inlet temperature of cooling water supplied to the absorber falls below the low-temperature value or exceeds the high-temperature value.

3. The method as defined in claim 2, wherein said step of determining that the maximum value for the opening of the fuel control valve is decreased from 100% when the inlet temperature of cooling water supplied to the absorber falls below the low-temperature value or exceeds the high-temperature value comprises the steps of:

determining that the maximum value for the opening of the fuel control valve is decreased by approximately 10/9% for every 1° C. decrease in the inlet temperature of cooling water supplied to the absorber when the inlet temperature of cooling water supplied to the absorber is lower than the low-temperature value; and determining that the maximum value for the opening of the fuel control valve is decreased by approximately 10% for every 1° C. increase in the inlet temperature of cooling water supplied to the absorber when the inlet temperature of cooling water supplied to the absorber is higher than the low-temperature value.

4. A method for controlling the amount of heating in a regenerator of an absorption refrigerating apparatus having an absorber and an evaporator, wherein cooling water is supplied to the absorber and cold water is removed from the evaporator, said method comprising the steps of:

determining a maximum value for the amount of heating in the regenerator based upon the inlet temperature of cooling water supplied to the absorber; and controlling the amount of heating in the regenerator based upon the outlet temperature of cold water removed from the evaporator, independent of the inlet temperature of cooling water supplied to the absorber, until the amount of heating in the regenerator reaches the maximum value, at which point the amount of heating in the regenerator is limited to the maximum value.

5. The method as defined in claim 4, wherein said step of determining a maximum value for the amount of heating in the regenerator comprises the steps of:

setting a low-temperature value for the inlet temperature of cooling water supplied to the absorber;

setting a high-temperature value for the inlet temperature of cooling water supplied to the absorber;

determining that the maximum value for the amount of heating in the regenerator is 100% when the inlet temperature of cooling water supplied to the absorber is between the low-temperature value and the high-temperature value; and determining that the maximum value for the amount of heating in the regenerator is decreased from 100% when the inlet temperature of cooling water supplied to the absorber falls below the low-temperature value or exceeds the high-temperature value.

6. The method as defined in claim 5, wherein said step of determining that the maximum value for the amount of heating in the regenerator is decreased from 100% when the inlet temperature of cooling water supplied to the absorber falls below the low-temperature value or exceeds the high-temperature value comprises the steps of:

determining that the maximum value for the amount of heating in the regenerator is decreased by approximately 10/9% for every 1° C. decrease in the inlet temperature of cooling water supplied to the absorber when the inlet temperature of cooling water supplied to the absorber is lower than the low-temperature value; and determining that the maximum value for the amount of heating in the regenerator is decreased by approximately 10% for every 1° C. increase in the inlet temperature of cooling water supplied to the absorber when the inlet temperature of cooling water supplied to the absorber is higher than the low-temperature value.

* * * * *